United States Patent [19]

Matsumoto

[11] Patent Number: 5,325,139
[45] Date of Patent: Jun. 28, 1994

[54] UNDERWATER HOUSING AND UNDERWATER TAKING CAMERA

[75] Inventor: Yasuo Matsumoto, Kanagawa, Japan
[73] Assignee: Fuji Photo Film Co., Ltd., Kanagawa, Japan
[21] Appl. No.: 890,774
[22] Filed: Jun. 1, 1992

[30] Foreign Application Priority Data

May 31, 1991 [JP] Japan .................... 3-155535

[51] Int. Cl.$^5$ .................... G03B 17/08; G03B 17/02
[52] U.S. Cl. .................... 354/64; 354/288
[58] Field of Search .................... 354/64, 288

[56] References Cited

U.S. PATENT DOCUMENTS

| | | | |
|---|---|---|---|
| 2,573,885 | 11/1951 | Whitman et al. | 354/64 |
| 3,019,715 | 2/1962 | Arnold et al. | 354/64 |
| 3,653,306 | 4/1972 | Takahama | 354/64 |
| 3,831,182 | 8/1974 | Shimizu | 354/64 |
| 4,803,504 | 2/1989 | Maeno et al. | 354/64 |
| 4,882,600 | 11/1989 | Van de Moere | 354/64 |
| 4,884,087 | 11/1989 | Mochida et al. | 354/64 |
| 4,972,649 | 11/1990 | Mochida et al. | 354/64 |
| 4,999,664 | 3/1991 | Foust | 354/64 |

FOREIGN PATENT DOCUMENTS

| | | |
|---|---|---|
| 2-32615 | 7/1990 | Japan . |
| 2-203329 | 8/1990 | Japan . |
| 3-54922 | 5/1991 | Japan . |
| 3-175435 | 7/1991 | Japan . |

*Primary Examiner*—Russell E. Adams
*Assistant Examiner*—Jae N. Noh
*Attorney, Agent, or Firm*—Young & Thompson

[57] ABSTRACT

A single-use camera is contained in an underwater housing, which as a box-shaped plastic housing body of which an opening is formed in the bottom. The bottom opening is covered with a watertight sheet sealed to an edge around the bottom opening, and keeps the camera watertight. The watertight sheet is constituted of a sandwich of an inner polystyrene (PS) layer, an aluminum core sheet, and an outer polyethylene terephthalate (PET) layer. The PS layer is used for heat sealing to the housing body. A bottom lid is fitted on the housing body and protects the watertight sheet. In a preferred embodiment, there is also a PET layer between the PS layer and the aluminum core sheet.

27 Claims, 5 Drawing Sheets

UNDERWATER HOUSING AND UNDERWATER TAKING CAMERA

BACKGROUND OF THE INVENTION

1. Field of the Invention

The present invention relates to an underwater housing and an underwater taking camera in combination therewith, more particularly to an improvement of a watertight structure of an underwater housing enclosing the camera.

2. Description Related to the Prior Art

A lens-fitted film unit or single-use camera, known as "Quick Snap" (trademark; manufactured by Fuji Photo Film Co., Ltd.), is preloaded with photographic film before a user purchases it. After all the frames are exposed, the film unit is forwarded to a photo laboratory in a condition wherein the film unit contains the exposed film. In the photo laboratory the photographic film is taken out of the film unit and subjected to photofinishing. Such convenience and simplicity in use is a characteristic feature of the film unit, which is sold commercially on a large scale. The film is contained in a photo-taking body of the film unit incorporating a simple mechanism for taking photographs. The phototaking body is packaged in a carton or cardboard pack. When the exposed film is removed in the photo laboratory, the carton is partly broken and the body is partly disassembled or broken.

There has been proposed an underwater type of lens-fitted film unit such as "Weekend 35" (trademark; sold by Eastman Kodak Co.) in which the film unit is enclosed in a transparent plastic underwater housing in order to take photographs at a depth of up to 2 to 3 meters underwater, or in other moist environment. This underwater housing is constituted of a box-shaped housing body and a lid, both of which are molded from plastic. After inserting the film unit in the housing body, the lid is firmly welded to the housing body to keep the film unit watertight.

When the film unit is removed from the housing body in the photo laboratory in order to develop the exposed film, however, it is necessary to remove the lid forcibly from the housing body or to break the housing body. The attachment between the lid and the housing body is strong enough to keep the unit watertight, so that the lid cannot be removed easily. The housing body is strong enough to resist even a considerable force applied externally thereto, so that the housing body cannot be broken with ease. The operation of taking the film unit out of the underwater housing is thus laborious. A photofinisher might accidentally break the housing manually into pieces, which might injure him or her.

The lid could be connected to the housing body via a hinge mechanism in order to simplify the removal of the film unit from the underwater housing. There could be, in this case, an arrangement of rubber members e.g. O-rings between the edges of the lid and the housing body for keeping the film unit watertight. This structure, however, is complicated and costly, and so is inconsistent with the provision of an underwater housing which is inexpensive, in keeping with the inexpensive film unit housed therein.

OBJECTS OF THE INVENTION

To overcome the foregoing problems, an object of the present invention is to provide an underwater housing and an underwater taking camera that is watertight and has a simple structure.

Another object of the present invention is to provide an underwater housing and an underwater taking camera wherein the film unit or camera is removable from the watertight housing with great ease.

SUMMARY OF THE INVENTION

In order to achieve the above and other objects and advantages of this invention, an underwater housing has a housing body in the shape of a box of which an opening is formed in one side so as to insert a camera therein. A watertight sheet covers the opening and has a peripheral edge adhered to an edge around the opening to keep the camera watertight in cooperation with the housing body. The watertight sheet includes a core sheet impermeable to moisture, a first resinous layer formed on an upper surface of the core sheet to be welded to the edge around the opening, and a second resinous layer laminated on a lower surface of the core sheet. In a preferred embodiment, the watertight sheet further includes a third resinous layer laminated between the core sheet and the first layer.

The structure of the present invention is simple and inexpensive and is advantageous for use as an underwater housing containing an inexpensive film unit. It is possible in accordance with the present invention to remove the watertight sheet from the housing body without great force in order to take the film unit out of the watertight housing. The attachment between the lid and the housing body is only strong enough to protect the side of the opening, so that the lid can be removed easily. The housing body does not need to be opened by breaking. There is accordingly no fear of injury to the photofinisher, because the housing will never be broken open manually.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
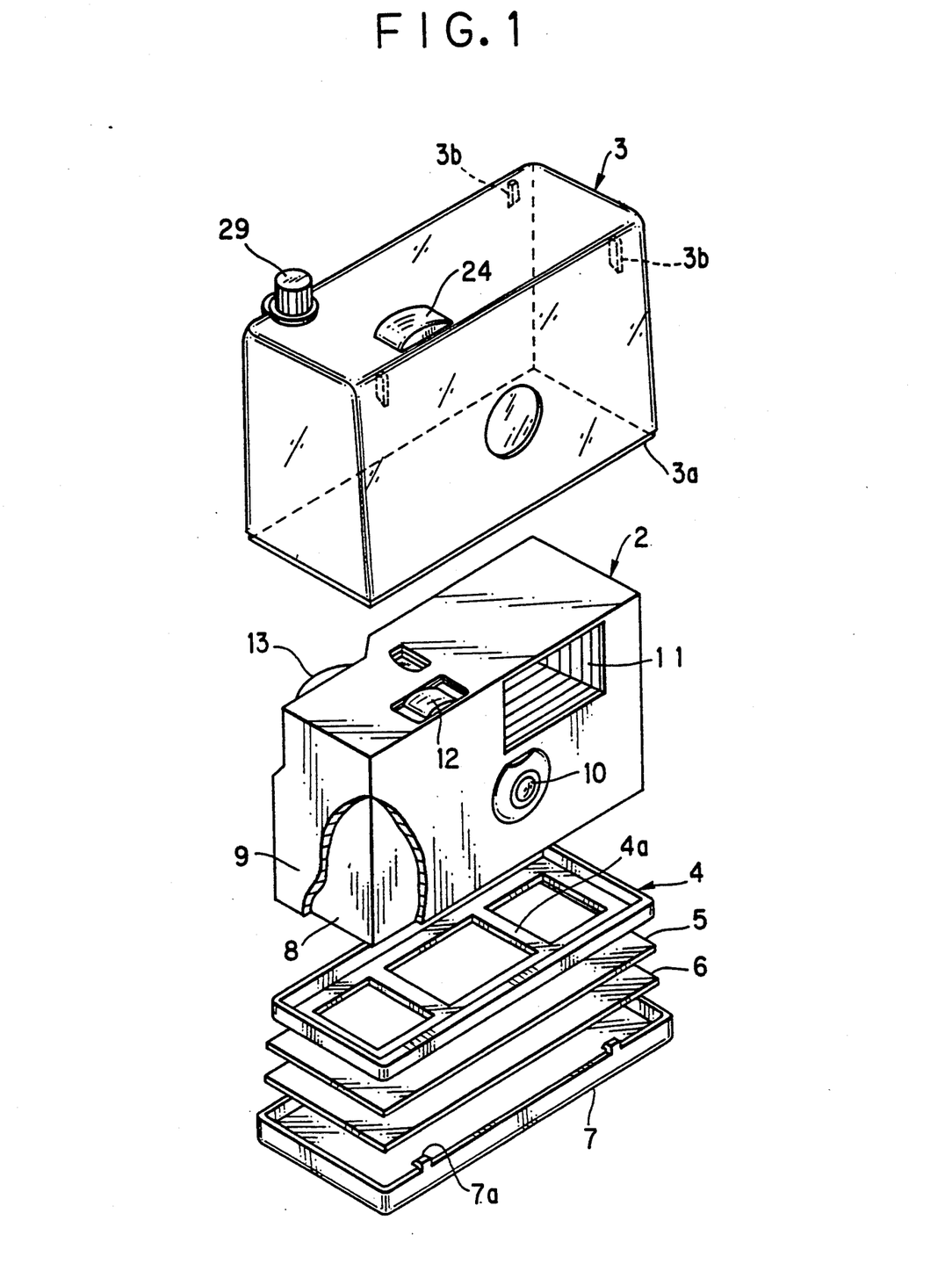
FIG. 1 is an exploded perspective view illustrating an underwater housing in accordance with the present invention, which housing contains a lens-fitted film unit.
Figure 2:
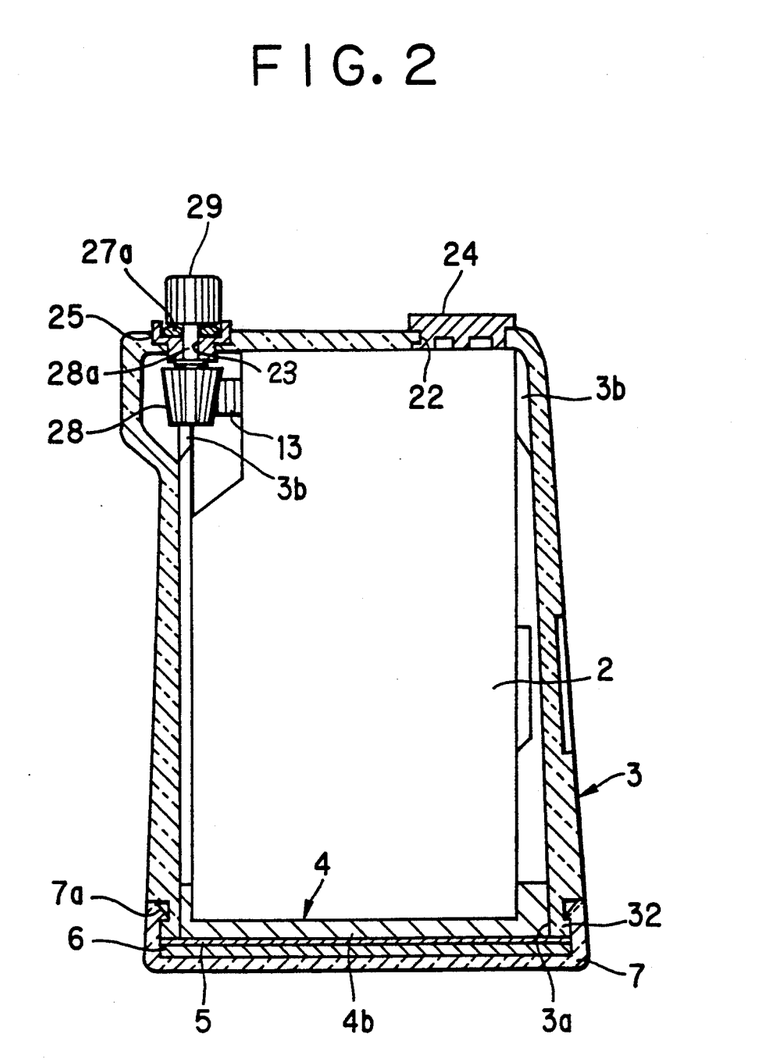
FIG. 2 is a cross section illustrating the underwater housing and the film unit illustrated in FIG. 1.

FIGS. 1 and 2 illustrate an underwater housing in use with a lens-fitted photographic film unit 2. The underwater housing is constituted by a transparent plastic housing body 3 having a bottom opening 3a and a plastic bottom lid 7 to be fitted on the housing body 3 to close the bottom opening 3a. Between the housing body 3 and the bottom lid 7 are disposed a plastic positioning frame 4, a watertight sheet 5, and a spacer sheet 6. With the film unit 2 inserted in the housing body 3 through the opening 3a, the frame 4 is fitted inside the opening 3a. The film unit 2 is immovably held by the frame 4 and by ridges 3b in the housing body 3.

Figure 3:
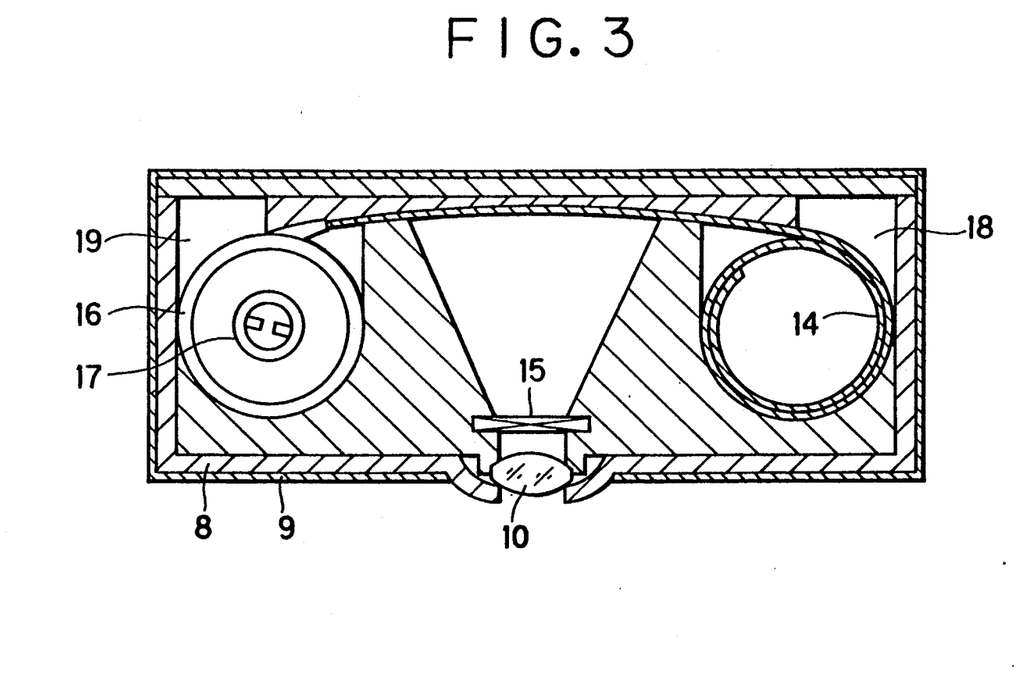
FIG. 3 is a horizontal section illustrating the film unit.

The basic structure of the film unit 2 is described in detail in U.S. Pat. No. 4,972,649 (corresponding to Japanese Patent Publ. No. 2-32615). The film unit 2 incorporates photo-taking mechanisms having a shutter mechanism 15, and initially contains a film cassette 16 including a 35 mm photographic film 14 as illustrated in FIG. 3. When a shutter release button 12 is depressed, a photograph is taken via a taking lens 10, after which a film wind-up wheel 13 is rotated to advance the photographic film 14 by one frame. To increase the friction of the fingers with the wind-up wheel 13, the periphery of the wind-up wheel 13 is provided with teeth formed in the shape of a gear.

A unitary body 8 of the film unit 2 is covered by a carton 9 having suitably disposed openings for exposing the taking lens 10, a viewfinder 11, the shutter button 12 and the wind-up wheel 13. The wind-up wheel 13 is linked with, and causes to rotate, a fork (not shown), which in turn is engaged with and rotates a spool 17 of the cassette 16. The film 14 is drawn from a film roll chamber 18 and wound back into the cassette 16 in a cassette chamber 19 frame by frame when the spool 17 rotates.

The portion of the housing body 3 overlying the taking lens 10 is defined between parallel planar surfaces and is of lesser thickness than other portions of body 3, so as to improve transparency and avoid degradation of the image quality. On the upper side of the housing body 3 are formed openings 22 and 23. In the opening 22 is fitted a shutter depressing member 24 to be manually pushed down for depressing the shutter button 12. The depressing member 24 is formed of elastic material e.g. rubber, and is fixedly fitted in the opening 22 so that no water can penetrate about the depressing member 24 and enter the housing body 3 even when operating the shutter button 12 via the depressing member 24 underwater.

In the opening 23 is fitted a support 25, on which an O-ring 27a is mounted and within which a shaft 28a is borne. The O-ring 27a prevents water from entering the housing body 3 when underwater, without impeding rotation of a manually operable know 29. On the shaft 28a are fixed a coupling gear 28 and the operable knob 29. The diameter of the gear 28 decreases progressively downward, and makes it easy to engage the gear 28 unfailingly with the teeth of the wind-up wheel 13 when the film unit 2 is inserted in the housing body 3 through the bottom opening 3a. It is to be noted that the operable knob 29 can be separate from the gear 28 but connected thereto via an idler, so that the direction of rotation of the operable knob 29 is designed to be the same as that of the wind-up wheel 13 when rotating knob 29 for winding up the photographic film 14. The knob 29 may be replaced by a lever as is well-known in the art.

On the frame 4 are formed two bridges 4a, which reinforce the frame 4 to prevent deformation of the housing body 3 and the watertight sheet 5 in the forward/backward direction as might otherwise be caused by a high water pressure. Because the upper side of the frame 4 has recesses adapted to receive the bottom of the film unit 2, the frame 4 so positions film unit 2 that the bottom of the film unit 2 is correctly positioned in the housing body 3. The watertight sheet 5 is heat-sealed onto the edge around the opening 3a so as to keep the inside of the underwater housing watertight. The spacer sheet 6 for supplying additional thickness is resilient and of foamed plastic e.g. polystyrene and is fitted on the bottom of the watertight sheet 5.

Around the bottom of the housing body 3 is formed a stepped edge 32. The bottom lid 7 is attached to the bottom of the housing body 3 by engaging hooks 7a with the stepped edge 32, so as to protect the watertight sheet 5. On the inside of the housing body 3 are formed ridges 3b integral therewith, which ridges serve to position the upper portion of the film unit 2. The resilient spacer sheet 6 biases the film unit 2 upward via the watertight sheet 5 and the frame 4. The spacer sheet 6 presses the watertight sheet 5 to prevent it from being peeled from sealing contact with the housing body 3 under the influence of water pressure and to prevent the film unit 2 via the frame 4 from having vertical play. The spacer sheet 6 is also a cushioning medium against external force applied to the bottom of the watertight housing, and is thus is effective in increasing the mechanical integrity of the housing.

Figure 4:
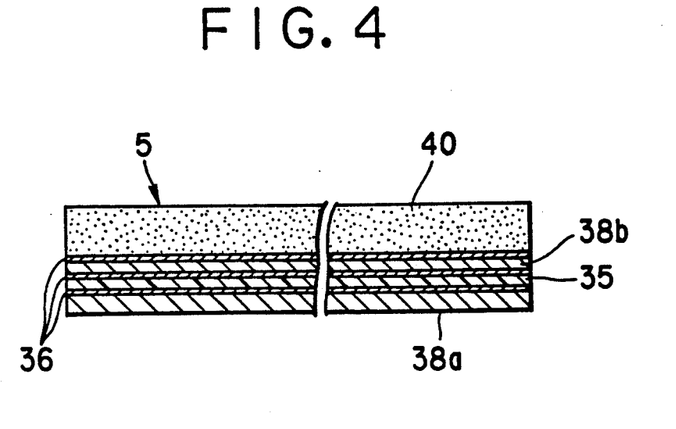
FIG. 4 is an enlarged fragmentary cross section illustrating the structure of a watertight sheet.

Referring to FIG. 4 illustrating the structure of the watertight sheet 5, an aluminum sheet 35 as a core material is 7 $\mu$m thick and impermeable to moisture. Polyethylene terephthalate (PET) layers 38a and 38b are each 12 $\mu$m thick and are secured to and sandwich between them the aluminum sheet 35, by dry laminate layers (adhesive layers) 36 each 1 $\mu$m thick. A polystyrene (PS) layer 40 is 40 $\mu$m thick and is secured to the upper PET layer 38b via a dry laminate layer 36. The PS layer 40 is heat sealed to the housing body 3.

In this layered structure, the aluminum sheet 35 and the PET layers 38a and 38b are laminated in a vertically symmetrical arrangement. Such a symmetrical arrangement is advantageous to facilitate manufacture of the watertight sheet 5 and to avoid any tendency to warping. The watertight sheet 5 according to the present invention is superior in the properties desired for heat sealing because the watertight sheet 5 can be heated without warping. The aluminum sheet 35 makes the watertight sheet 5 not only watertight but also strengthens it against rupture without reducing its resilience. It is preferable for these purposes of the watertight sheet 5 that the aluminum sheet 35 be at least 5 $\mu$m thick. The temperature for heat sealing of the PS layer 40 is preferably in the range from 170° to 200° C.

It is also necessary for the watertight sheet 5 to by manually separable from the housing body 3 before the film unit 2 is taken out of the watertight housing, and to be resistant to elevated temperature, possibly up to 65° C. for example on the beach. An experiment was conducted on the watertight capacity of sheet 5. The bottom opening 3a of a watertight housing was closed by the frame 4, the watertight sheet 5, the spacer sheet 6 and the bottom lid 7. There was no problem of undesired separation of the sheet 5 even at 65° C. The inside was kept reliably watertight even at a water depth of 4 meters. The manual operation of peeling off the watertight sheet 5 was carried out with ease. It is to be noted that the bridges 4a are advantageous in lessening the deformation of the watertight sheet 5 even under the pressure of water.

Figure 5:
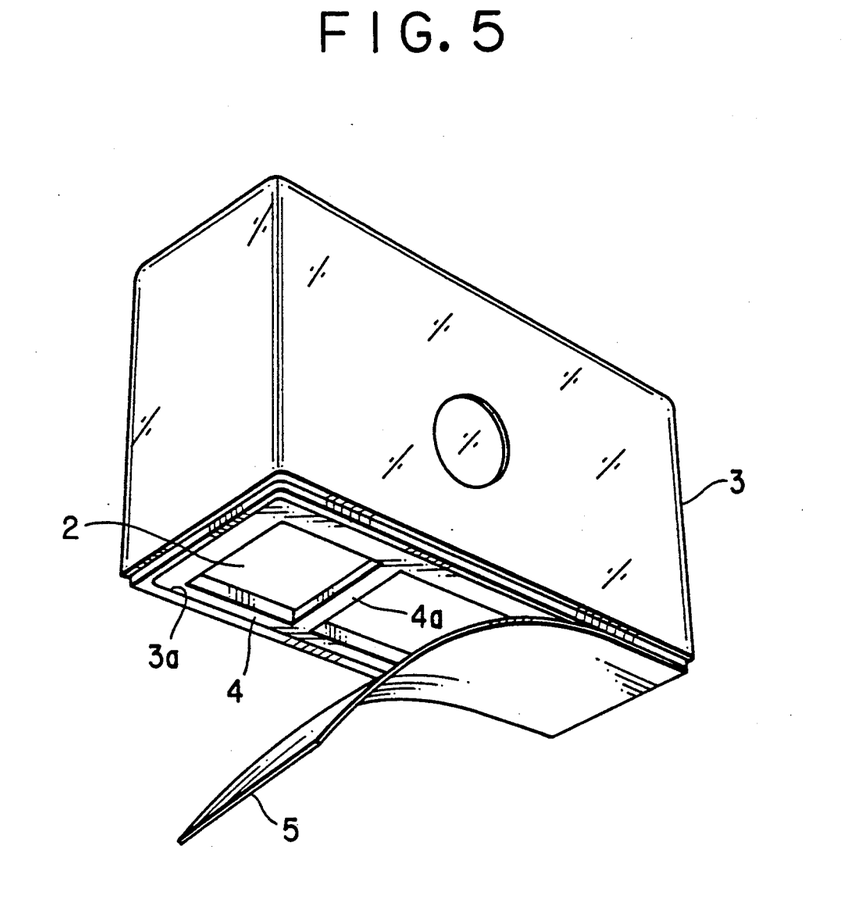
FIG. 5 is an explanatory view illustrating how to peel the watertight sheet.

After all the film 14 in the film unit 2 contained in the underwater housing is used, the housing is opened and the film unit 2 is removed and the exposed film is developed in a photo laboratory. To do this, the bottom lid 7 is unsnapped from housing body 3, spacer sheet 6 is separated from the housing body 3, and the watertight sheet 5 is peeled off by pulling its one end as illustrated in FIG. 5. The adhesion of the PS layer 40 to the margins of bottom opening 3a is low enough to permit peeling off the sheet 5 manually, so that a manual peeling operation can be efficiently performed. The bottom edge around the bottom opening 3a and the sides of the frame 4 are neatly separable without any damage, so that the housing body 3 and the frame 4 are reusable as well as the bottom lid 7. The film unit 2 is withdrawn from inside the housing body 3, and the carton 9 is partly broken to open a lid at the bottom of the cassette chamber 19. The cassette 16 containing the exposed film 14 can then be removed from the body 8 form photofinishing.

Figure 6:
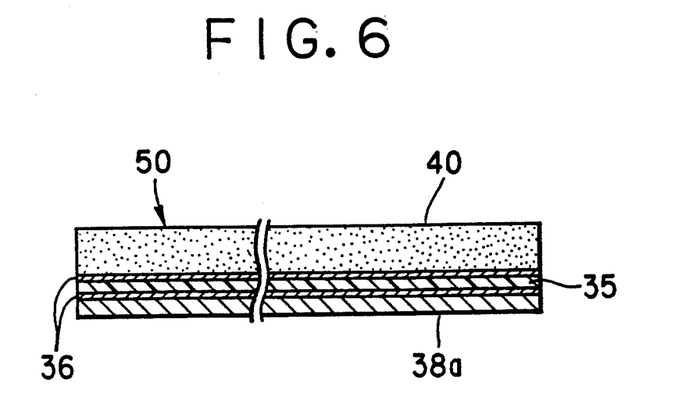
FIG. 6 is an enlarged fragmentary cross section illustrating the structure of a watertight sheet in accordance with another preferred embodiment.

Referring to FIG. 6 illustrating another preferred embodiment, a watertight sheet 50 is similar to the sheet 5 in FIG. 4 but lacks the upper PET layer 38b. The upper side of the aluminum sheet 35 is bonded to the PS layer 40 via a dry laminate layer 36, so that the PS layer 40 is nearly symmetrical with the PET layer 38a in relation to the aluminum sheet 35. As determined by experiments, the watertight sheet 50 suffered no warping either, and was superior as to watertightness, resistance to pressure and resistance to heat. The separation of the watertight sheet 50 from the housing body 3 for removing the film unit 2 was manually performable without difficulty.

It is to be noted that resinous layers laminated on the surfaces of the aluminum sheet 35 may be of materials other than PET and PS. The core sheet may be of a material other than aluminum. The thicknesses of the resinous layers can be determined to be such that no warping takes place in the watertight sheet.

Although the underwater housing according to the above embodiments is openable at its bottom, the present invention is also applicable to an underwater housing of which a rear side or lateral side is openable. Such a rear-side openable housing is convenient particularly for a camera or a lens-fitted film unit of which a rear wall is openable for receiving and removing a photographic film, while the bottom-openable housing is naturally convenient for a camera or a film unit of which a bottom wall is openable.

In the above embodiments, the lens-fitted film unit is factory-assembled in the underwater housing, and sold as an underwater taking camera commercially in the market. After the user has made all the exposures on the photographic film, the underwater camera is forwarded to a photo laboratory without disassembly. A photofinisher disassembles the underwater camera, performs photofinishing, and returns the negative film as processed to the user together with photo-prints as obtained by printing the negative film. The underwater housing as well as the lens-fitted film unit is recyclable. However, the underwater housing may be sold separately, in which case the user may insert a lens-fitted film unit before underwater photography. In assembling the film unit in the underwater housing, the watertight sheet is attached to the housing body adhesively. The present underwater housing is applicable, not only to a lens-fitted film nit or a single-use camera, but also to a reusable photographic camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they can be construed as included therein.

I claim:

1. An underwater housing for containing in watertight fashion a camera having a shutter release button and a wind-up wheel of which one portion of said wheel protrudes from a body of a said camera and of which wheel a periphery is provided with teeth formed in a regular arrangement, said wind-up wheel causing photographic film to advance by one frame when rotated, said underwater housing comprising:

a housing body in the shape of a box of which are opening is formed in one side so as to insert a said camera therein, said housing body being made of rigid transparent material;

a watertight sheet for covering said opening, having a peripheral edge in sealing engagement with an edge around said opening to keep said camera watertight in cooperation with said housing body;

a lid fitted on said housing body so as to protect said watertight sheet;

a first externally operable member rotatably mounted on said housing body;

a gear for rotating a said wind-up wheel of a said camera, said gear being adapted to be coupled with said protruding portion of said wind-up wheel within said housing body;

transmitting means for transmitting rotation of said first operable member to said gear; and a second externally operable member provided on said housing body for actuating said shutter button, wherein said watertight sheet includes:

a) a core sheet impermeable to moisture;

b) a first resinous layer formed on a surface of said core sheet to be adhered to said edge around said opening; and c) a second resinous layer laminated on a surface of said core sheet opposite said first layer.

2. An underwater housing as defined in claim 1, wherein said opening is formed in a bottom of said housing body.

3. An underwater housing as defined in claim 1, wherein said watertight sheet further includes a third resinous layer laminated between said core sheet and said first layer and constituted of the same resin as said second layer.

4. An underwater housing as defined in claim 1, wherein said lid is fitted on a periphery of said edge around said opening of said housing body, and retained on said housing body by engaging hooks.

5. An underwater taking camera comprising in combination a camera and an underwater housing in which said camera is removably contained;

said camera including:

1) a camera body preloaded with photographic film;

2) a wind-up wheel for causing said photographic film to advance by one frame when rotated after exposure, of which wind-up wheel a periphery is provided with teeth formed in a regular arrangement, and of which wind-up wheel one portion protrudes from said camera body; and 3) a shutter release button exposed on an outer side of said camera body;

said underwater housing including:

a) a housing body in the shape of a box of which an opening is formed in a one side so as to insert said camera therein, said housing body being made of rigid transparent material;

b) a watertight sheet for covering said bottom opening, having a peripheral edge sealed to an edge around said bottom opening to keep said camera watertight in cooperation with said housing body, said watertight sheet including:
  (b1) a core sheet impermeable to moisture;
  (b2) a first resinous layer formed on an inner surface of said core sheet and in sealed relation with said edge around said opening; and
  (b3) a second resinous layer laminated on a surface of said core sheet opposite said first layer;
c) a lid fitted on said housing body so as to protect said watertight sheet;
d) a first externally operable member rotatably mounted on a side of said housing body;
e) a gear for rotating said wind-up wheel, said gear being coupled with said protruding portion of said wind-up wheel within said housing body;
f) transmitting means for transmitting rotation of said first operable member to said gear; and
g) a second externally operable member provided on said housing body for actuating said shutter button.

6. An underwater taking camera as defined in claim 5, wherein said core sheet is of aluminum, said first layer is of polystyrene, and said second layer is of polyethylene terephthalate.

7. An underwater taking camera as defined in claim 5, wherein said watertight sheet further includes a third resinous layer laminated between said core sheet and said first layer and constituted of the same resin as said second layer.

8. An underwater taking camera as defined in claim 5, further comprising: a frame member fitted on said edge around said opening of said housing body on an inner side of said watertight sheet for keeping said camera immovable within said housing body; and a spacer sheet disposed between said lid and said watertight sheet for pressing said frame member elastically against said housing body via said watertight sheet.

9. An underwater taking camera as defined in claim 5, wherein said second operable member is an elastic member mounted to close in watertight fashion a second opening formed in said housing body for being pressed when actuating said shutter button.

10. An underwater housing for containing a camera in watertight fashion, comprising:
  a housing body in the shape of a box of which an opening is formed in one side so as to insert said camera therein; and
  a watertight sheet for covering said opening, having a peripheral edge adhered to an edge around said opening to keep said camera watertight in cooperation with said housing body;
  a lid fitted on said housing body so as to protect said watertight sheet; and
  a resilient spacer sheet disposed between said lid and said watertight sheet for pressing said watertight sheet elastically against said housing body.

11. An underwater housing as defined in claim 10, said watertight sheet including:
  a) a core sheet impermeable to moisture;
  b) a first resinous layer formed on an inner surface of said core sheet to be adhered to said housing body; and
  c) a second resinous layer laminated on a surface of said core sheet opposite said first sheet.

12. An underwater housing as defined in claim 11, further comprising a frame member fitted within said edge around said opening of said housing body on an inner side of said watertight sheet for keeping said camera immovable within said housing body.

13. An underwater housing for containing a camera in watertight fashion, comprising:
  a housing body in the shape of a box having an opening formed in one side so as to insert said camera therein; and
  a watertight sheet covering said opening, having a peripheral edge sealingly engaging an edge around said opening to keep said camera watertight in cooperation with said housing body;
  further comprising: a frame member fitted within said edge around said opening of said housing body on an inner side of said watertight sheet for keeping a said camera immovable within said housing body; and a spacer sheet disposed between a lid closing said opening of said housing body and water watertight sheet for pressing said watertight sheet elastically against said housing.

14. An underwater housing as defined in claim 13, wherein at least one reinforcing member is formed on said frame member across an opening in said frame member.

15. An underwater housing as defined in claim 14, containing a single-use camera in which photographic film is preloaded, said single-use camera being encased in a carton.

16. An underwater housing for containing in watertight fashion a camera having a shutter release button and a wind-up wheel of which one portion of said wheel protrudes from a body of a said camera and of which wheel a periphery is provided with teeth formed in a regular arrangement, said wind-up wheel causing photographic film to advance by one frame when rotated, said underwater housing comprising:
  a housing body in the shape of a box of which an opening is formed in one side so as to insert a said camera therein, said housing body being made of rigid transparent material;
  a watertight sheet for covering said opening, having a peripheral edge in sealing engagement with an edge around said opening to keep said camera watertight in cooperation with said housing body;
  a lid fitted on said housing body so as to protect said watertight sheet;
  a first externally operable member rotatably mounted on said housing body;
  a gear for rotating a said wind-up of a said camera, said gear being adapted to be coupled with said protruding portion of said wind-up wheel within said housing body;
  transmitting means for transmitting rotation of said first operable member to said gear; and
  a second externally operable member provided on said housing body for actuating said shutter button,
  further comprising: a frame member fitted on said edge around said bottom opening of said housing body on an inner side of said watertight sheet for keeping said camera immobile within said housing body; and a resilient spacer sheet disposed between said bottom lid and said watertight sheet for pressing said frame member elastically against said housing body via said watertight sheet.

17. An underwater housing for containing in watertight fashion a camera having a shutter release button and a wind-up wheel of which one portion of said wheel protrudes from a body of a said camera and of which wheel a periphery is provided with teeth formed in a regular arrangement, said wind-up wheel causing photographic film to advance by one frame when rotated, said underwater housing comprising:

a housing body in the shape of a box of which an opening is formed in one side so as to insert a said camera therein, said housing body being made of rigid transparent material;

a watertight sheet for covering said covering, having a peripheral edge in sealing engagement with an edge around said opening to keep said camera watertight in cooperation with said housing body;

a lid fitted on said housing body so as to protect said watertight sheet;

a first externally operable member rotatably mounted on said housing body;

a gear for rotating a said wind-up wheel of a said camera, said gear being adapted to be coupled with said protruding portion of said wind-up wheel within said housing body;

transmitting means for transmitting rotation of said first operable member to said gear; and a second externally operable member provided on said housing body for actuating said shutter button, wherein said second operable member is an elastic member mounted to close in watertight fashion a second opening formed in said housing body and elastically deformable when pressed to actuate said shutter button.

18. An underwater housing for containing a camera in watertight fashion, comprising:

a housing body in the shape of a box having an opening formed in one side so as to insert said camera therein; and a watertight sheet covering said opening, having a peripheral edge sealingly engaging an edge around said opening to keep said camera watertight in cooperation with said housing body, wherein said watertight sheet includes:
a) a core sheet impermeable to moisture;
b) a first resinous layer on a surface of said core sheet to be applied to said housing body;
c) a second resinous layer laminated on a surface of said core sheet opposite said first layer.

19. An underwater housing as defined in claim 1, wherein said opening is formed in a bottom of said housing body.

20. An underwater housing as defined in claim 19, wherein a bottom lid is fitted on a periphery of said bottom of said housing body so as to protect said watertight sheet.

21. An underwater housing as defined in claim 20, wherein said housing body is molded from transparent resin.

22. An underwater housing as defined in claim 18, wherein said watertight sheet further includes a third resinous layer laminated between said core sheet and said first layer.

23. An underwater housing as defined in claim 22, wherein said second and third layers are constituted of the same resin.

24. An underwater housing as defined in claim 18, wherein said first layer of said watertight sheet is heat sealed to said edge around said opening.

25. An underwater housing as defined in claim 18, wherein said core sheet is an aluminum sheet.

26. An underwater housing as defined in claim 18, wherein said core sheet and said resinous layers are bonded with dry laminate layers one to another.

27. An underwater housing as defined in claim 1, wherein said first layer is of polystyrene, and said second layer is of polyethylene terephthalate.

* * * * *